(12) United States Patent
Pal

(10) Patent No.: US 7,170,047 B2
(45) Date of Patent: Jan. 30, 2007

(54) OPTO-ELECTRONIC ENCODER WITH THREE-DIMENSIONAL SCALES

(76) Inventor: Anadish Kumar Pal, 194 Vaishali, Pitampura, Delhi (IN) 110088

( * ) Notice: Subject to any disclaimer, the term of this patent is extended or adjusted under 35 U.S.C. 154(b) by 212 days.

(21) Appl. No.: 10/894,078

(22) Filed: Jul. 19, 2004

(65) Prior Publication Data

US 2006/0011821 A1   Jan. 19, 2006

(51) Int. Cl.
*G01D 5/34* (2006.01)
*G09G 5/08* (2006.01)

(52) U.S. Cl. ............. 250/231.13; 345/166; 250/237 G; 356/499

(58) Field of Classification Search .............................. 250/231.13–231.18, 237 G, 231.1; 356/499
See application file for complete search history.

(56) References Cited

U.S. PATENT DOCUMENTS 5,323,001 A * 6/1994 Igaki et al. ............ 250/231.16
5,902,999 A * 5/1999 Yanagi .................... 250/231.1
6,084,574 A * 7/2000 Bidiville ...................... 345/166

* cited by examiner

*Primary Examiner*—Thanh X. Luu
*Assistant Examiner*—Tony Ko

(57) ABSTRACT

A single-, two- or three-axis opto-electronic encoder, or error-inputting device, with an optical scale which is overall cylindrical, spherical or volumetric, as opposed to extant planar, circular optical scales; mostly parallel rays of light enter from the cylindrical or spherical surface of the scale, travel, with or without being modulated in intensity due to rotation/rotations of, or distortion/distortions in, the scale, along elliptical and/or circular sectional planes of the scale and exit to fall upon an obstructing opto-electronic sensor or a plurality of such sensors. A photo-transmissive spherical float on a photo-opaque liquid sealed inside a spherical optical scale, moving vertically under the influence of an external force, upwardly displacing the photo-opaque liquid to block the light that enters the spherical optical scale from reaching any of the opto-electronic sensors, produces a distinct electronic condition for auxiliary use in addition to or conjunction with encoder or error-inputting device output or outputs.

20 Claims, 5 Drawing Sheets

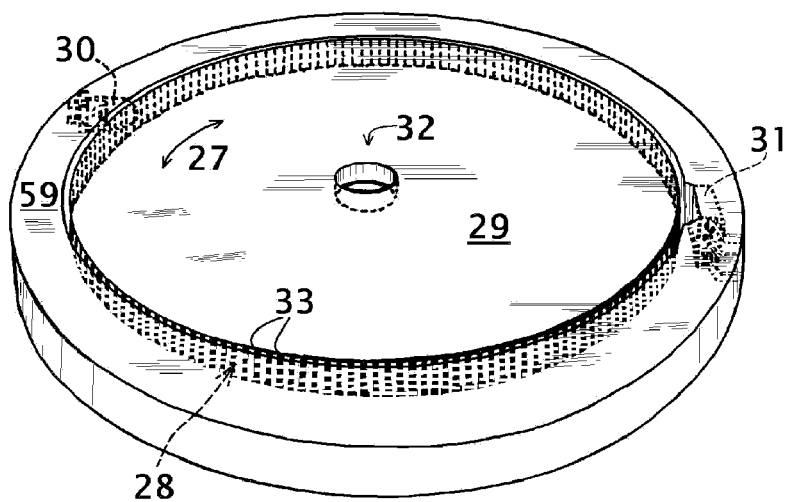
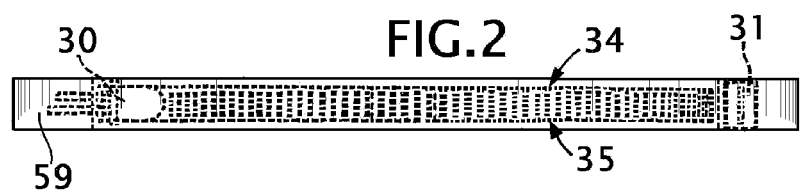
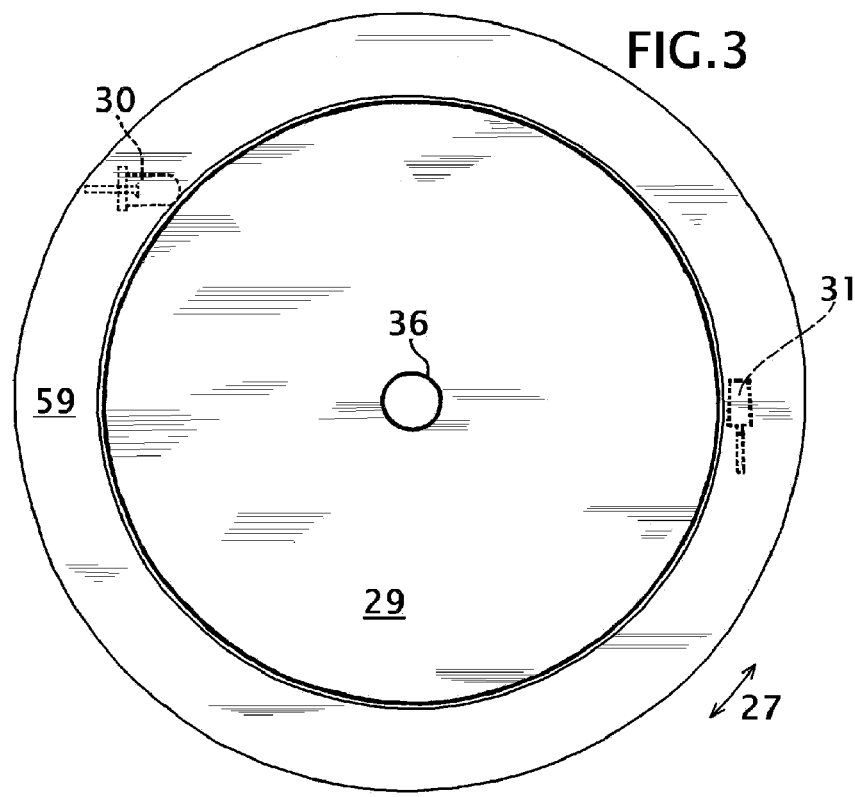

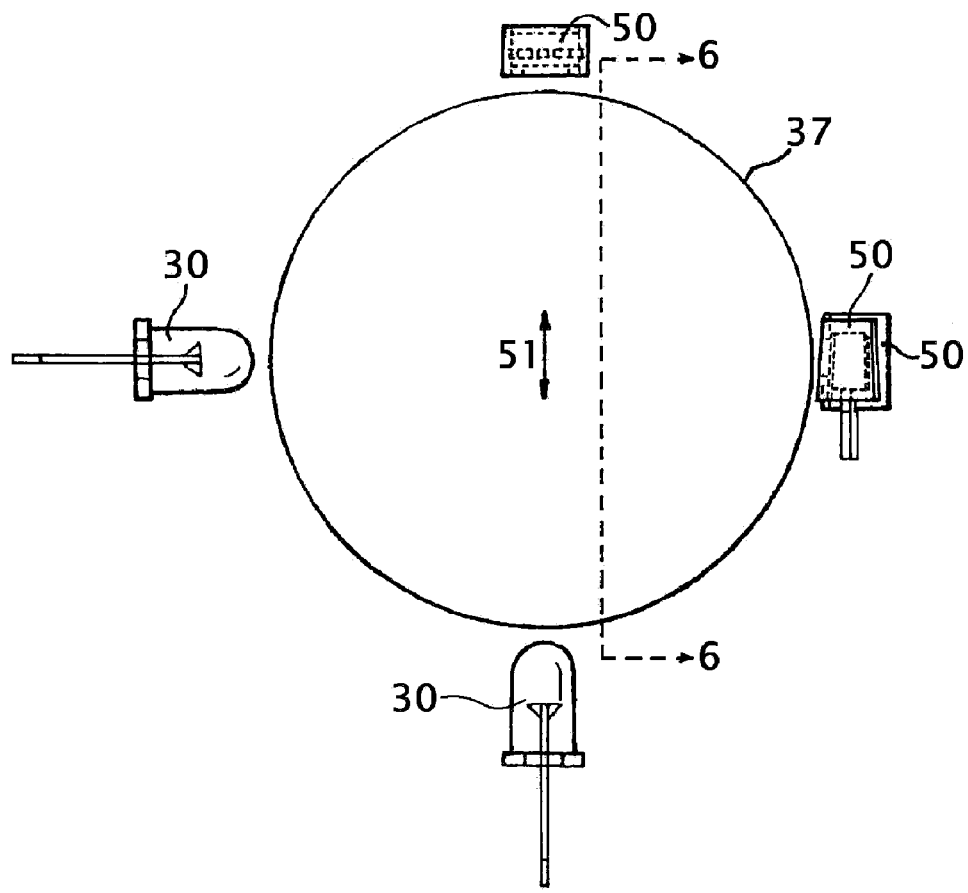
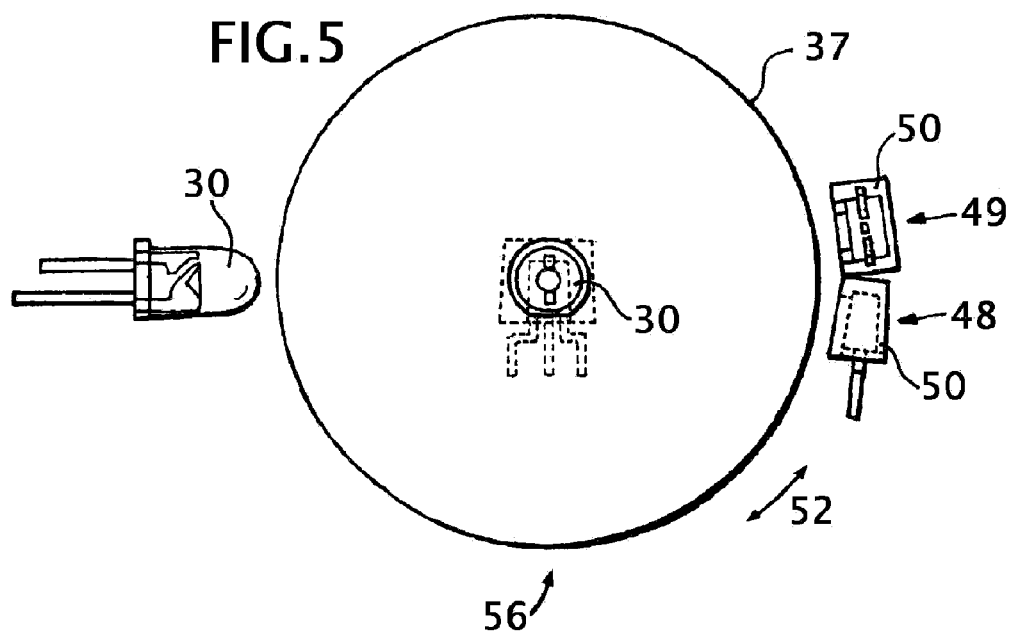

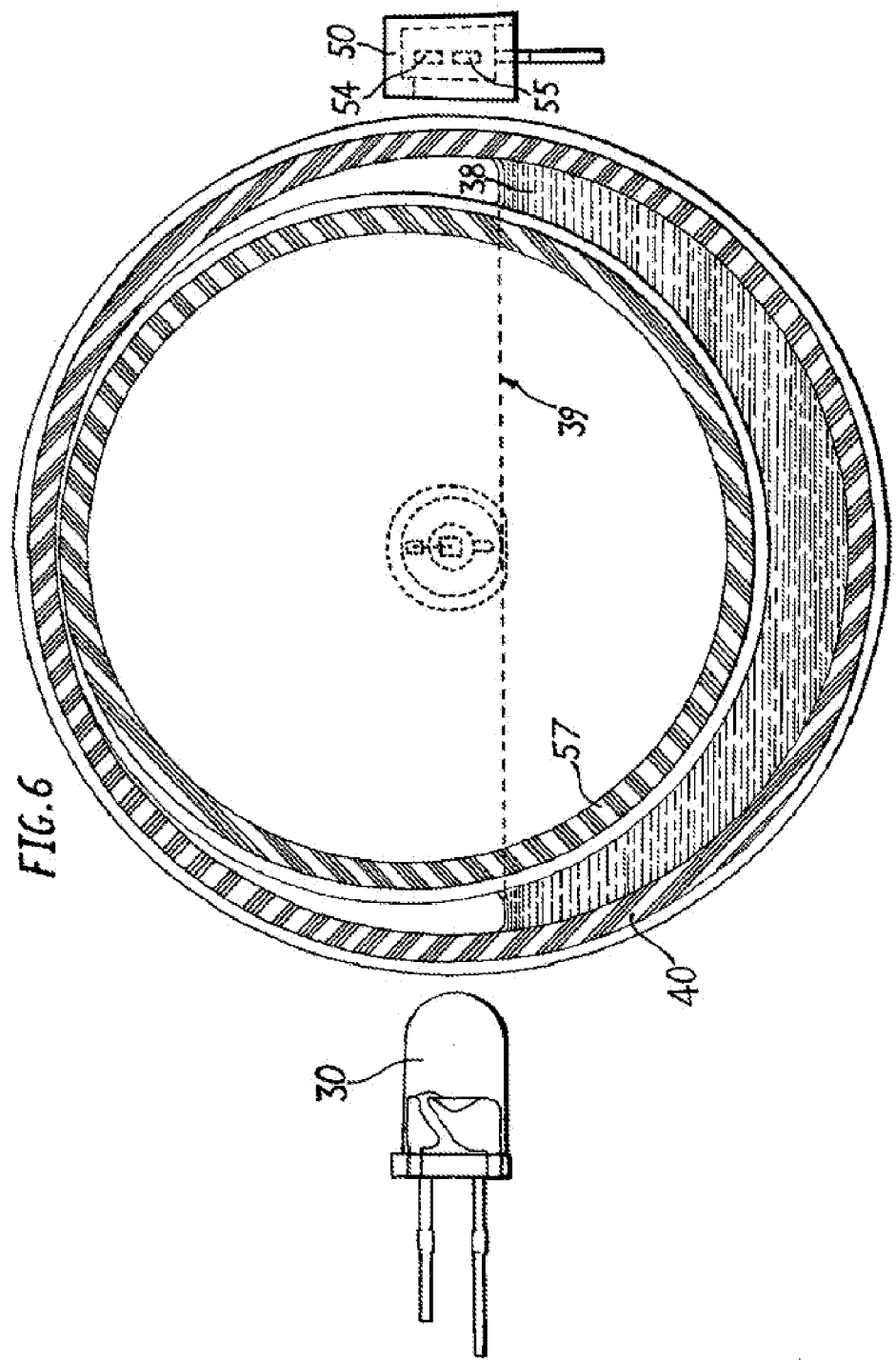

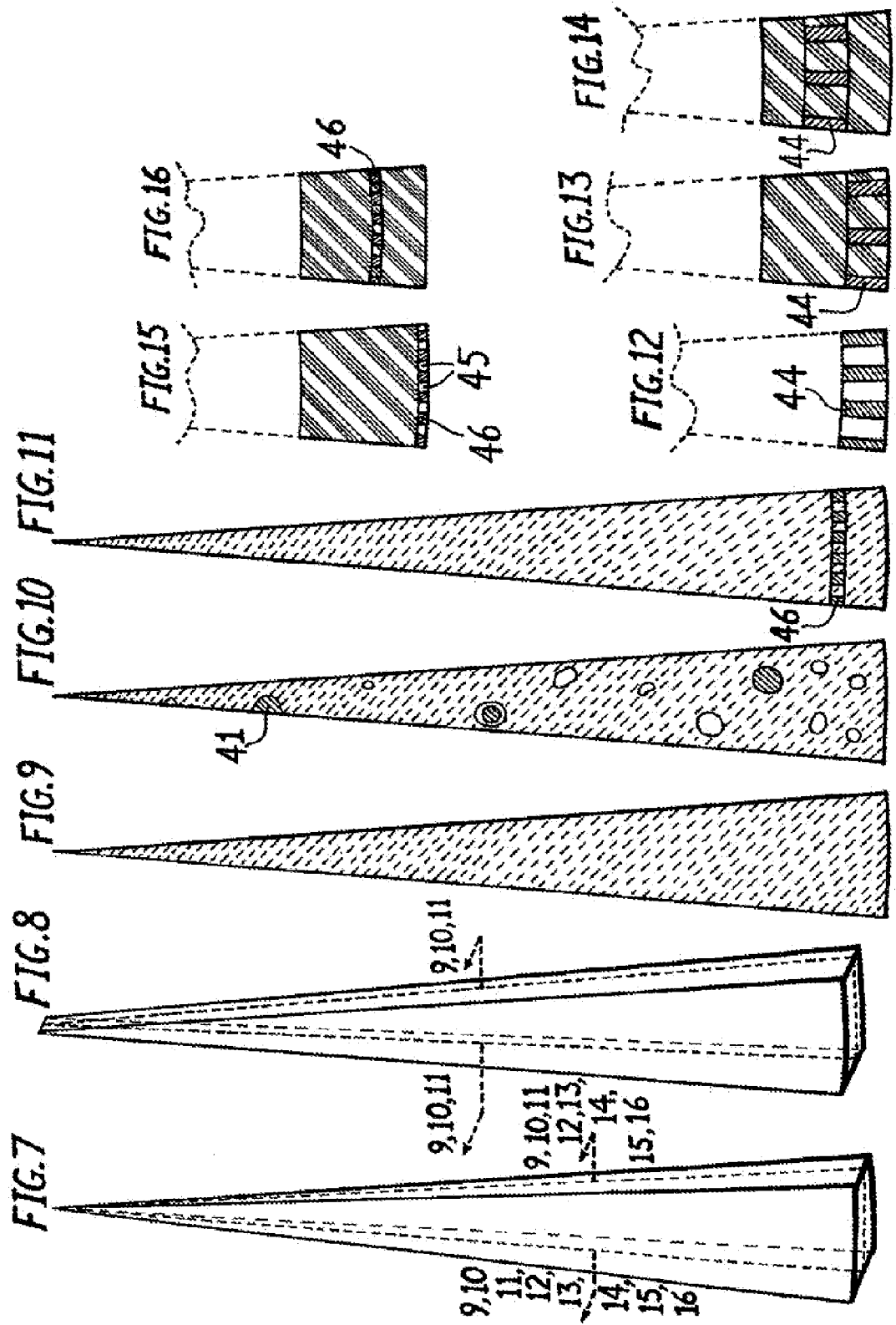

OPTO-ELECTRONIC ENCODER WITH THREE-DIMENSIONAL SCALES

BACKGROUND OF THE INVENTION

The present invention is directed to the field of opto-electronic encoders with digital- or analogue-coded output or outputs.

In the related field, opto-electronic encoder devices essentially consist of an optical barrier, systematic removal of that barrier does encoding of a movement linked to the optical barrier. Documentation of pioneering work finds place in U.S. Pat. Nos. 2,537,427, 2,685,082 and 2,944,157. All of these patents have a rotatory disc with numerous radial apertures to allow light from a phototransmitter to pass. The thickness of the disc with coded scale was only governed by the strength of material with which it was fabricated. The thinnest possible discs became desirable, as the electrical light-producing methods were not very efficient. Their low efficiency and limited filament life marked incandescent lamps. Running them only at very low illumination levels could make them longer lasting. Initial light-emitting diodes (LEDs) too were not bright or efficient. That meant keeping the distance between the phototransmitter and the opto-electronic receiver as small as possible. Semiconductor manufacturers too started manufacturing such pairs housing a transmitter and a receiver spaced apart just by a fraction of a centimeter, in a package. This configuration made application of opto-electronics very easy for the encoder maker. U.S. Pat. Nos. 3,269,190, 3,304,434, 3,789,218 and 3,987,685 disclose the means to devise a multi-coordinate input device using two sets of disc encoders. Using another set of disc encoders to make it into a three-axis encoder could extend this scheme.

A simple three-axis encoder can be used to detect error signals and to make a toy robot remain upright. If the extended coordinate input device is used for this application, the ball has to have an eccentric center of gravity. Due to friction with the three rotating shafts rolling along the surface of the ball, the movement of the ball would not only be retarded, it could also fail to rotate sometimes. Frictionless data gathering solutions for comparative free rolling of the ball are disclosed in U.S. Pat. Nos. 5,831,553 and 6,686,584. U.S. Pat. No. 5,831,553 discloses a heavy ball as the central member with an eccentric center of gravity—suitable for the application presently discussed. The relative complexities involved in the implementation of both the schemes make them unsuitable for a cost-effective application. Furthermore, the use of a rolling magnetic element would cause ferromagnetic loose particles to attach to the rolling ball, and thus impede reliability.

For constructing a rotational single-axis encoder or input device, as noted earlier, use is made of an opto-electronic link placed axially on a circular optically coded disc. Though this construction has become an industry standard, there are two notable problems associated with this kind of axial mounting. The removal of the circular disc scale involves the removal of the optical transceiver pair; the minimum thickness of the whole encoder assembly together with the associated electronic components for processing the data seems to have reached a limit. There must be three layers in such an encoder—first, a printed circuit board (PCB) holding the phototransmitter and some electronics, next, the circular disc scale, and lastly, another PCB holding the opto-electronic receiver and the rest of the electronic components. By making use of thick-film technology, the overall thickness of this stack could be approximately 1.5 mm. Even a slight wobble in the disc scale due to anomalies would immediately damage the electronics on both the PCBs flanking the disc scale. Trying to increase the clearance on both the sides of the disc scale would definitely increase the thickness of the overall encoder assembly. There are also maintenance problems associated with this kind of construction. The accumulation of oil, moisture, or dirt on the scale goes unnoticed, until encoder failure takes place. Cleaning of the disc scale is possible with some care, but the cleaning of the optical transmitter and receiver active surfaces is very difficult. Replacement of a disc scale with a new one is also a complicated job, due to the basic axial positioning of the constituents of the optical transceiver pair on either flat side of the disc scale. Minute cracks in the body of a thermoplastic disc scale go unnoticed until mechanical failure occurs. U.S. Pat. No. 5,638,165 discloses a method of embedding optical fiber strands in a structure, and to gauge the thinning of the fibers at cracked positions. This method would be difficult to implement in a miniature mechanism like that of an opto-electronic encoder. The disc is constructed of transparent material, like glass or a transparent thermoplastic. A simple method which would give warning when small cracks appear in the circular disc would be of value, even with existing opto-electronic encoders.

BRIEF SUMMARY OF THE INVENTION

The existing optical encoder scales, though structurally three dimensional, are essentially two-dimensional in function; this invention presents optical encoder scales which necessarily have to be three-dimensional in order to provide encoder functions. Due to the considerably large functional third dimension of the optical encoder scale, which is parallel with the direction of the phototransmitter main beam, the phototransmitter and opto-electronic receiver are placed sufficiently apart to well accommodate the optical encoder scale of the present invention.

The single-axis version of the present invention consists of a cylindrical encoder disc made of transparent thermoplastic or glass, bearing an optical encoder scale on its cylindrical side close to the outer edge, a phototransmitter (a non-diffused LED), and an opto-electronic sensor unit facing the cylindrical optical encoder scale (henceforth, to be called cylindrical optical scale) in such a manner that the light emitted by the transmitter passes through the cylindrical optical scale, enters the transparent cylindrical optical scale cordially, undergoes refraction, and comes out from the area of focus on the opposite side where the opto-electronic sensor unit faces this rectangular beam after it has crossed the cylindrical optical scale again. This second crossing of the cylindrical optical scale creates the relevant optical pattern on the opto-electronic sensor unit, while the first crossing, just after the light leaves the phototransmitter, imparts slight modulation on the intensity of the beam. The openings and closings on the cylindrical optical scale are much smaller than the width of the light beam from the phototransmitter. Without using the cylindrical optical scale of the present invention, the new optical transmitter-receiver configuration is fit to be implemented on a conventional planar optical and in conjunction with axially located optical transmitter-receiver units to detect minute cracks in the body of the planar optical disc and accumulation of dirt on its sides and edges.

The single-axis version of the present invention appears as a flat assembly in contrast with the three-layer assemblies of conventional opto-electronic encoders. As mentioned in the beginning, though the thickness of the cylindrical optical scale might seem negligible in comparison to the diameter of the same, it does function as the medium in which the beam of light travels from the phototransmitter to the opto-electronic sensor unit. This thickness cannot be made smaller than the diameter of the lens of the phototransmitter LED without sacrificing the optical utilization of the phototransmitter output. In the case of conventional opto-electronic encoders, the thickness of a planar optical scale is only limited by structural constraints. Theoretically, in this case, a light-opaque metallic film a few microns thick can also function as an effective optical barrier. This superficially planar placement of a phototransmitter and opto-electronic sensor with reference to a cylindrical optical scale makes the present construction more accessible for inspection and cleaning and, moreover, physically easier to disassemble.

The two- or three-axis form of the present invention consists of a spherical shell with multiple optical apertures distributed all over or near its surface, functioning together as the spherical optical encoder scale. With either air or some transparent material inside the spherical shell, the active surfaces of the mainly diametrically placed phototransmitters and opto-electronic sensors face each other/face one another. The basic operation of this novel encoder with a spherical optical scale is similar to the single-axis encoder of the present invention described hereinabove. To encode the three axes, three sets of opto-electronic devices are fitted at their logical places with regards to the mechanical structure of the encoder, each set consisting of a phototransmitter (a non-diffused LED) and an opto-electronic sensor unit. The multi-aperture spherical optical scale described hereinabove is set in motion by external forces by employing various means. The addition of a transparent material inside the spherical optical scale would reduce the driving power of the phototransmitter LED to almost by converging light from the phototransmitter on to the opto-electronic sensor unit in each set. Another possibility is to fill the spherical optical scale with a liquid opaque to the light of the transmitter LED and to put another light-weight, hollow and transparent spherical body permanently afloat on the liquid, the level of the liquid just below the active area of the opto-electronic receiver units. In this form the spherical optical scale responds to an impacting or distorting force by blocking the optical signal to all the opto-electronic sensor units—this in itself could generate a distinct signal to be used for various purposes. By making one half of the spherical optical scale heavier than the other, the center of gravity of the spherical optical scale becomes eccentric and makes a free-to-roll spherical optical scale which always settles in only one approximate position under the influence of gravity. This sums up the construction of not only a simple encoding apparatus, but also of a balancing-error-inputting device for a toy robot to remain upright and to mimic various human actions. This construction does away with the conventional frictionally revolving encoder discs, previously necessary for encoding, but which impeded the freedom of the rolling device. At the same time, it keeps the process of reading an encoded movement uncomplicated. The removal of the frictional elements also makes the present invention capable to be used with a prosthetic or robotic ball-and-socket joint as an integral three-axis, contact-less encoder, without increasing size of the joint or its complexity. To achieve this, the spherical encoder is joined to one end of a limb to become the ball of the joint, while all the opto-electronics are put into the socket part of the joint.

Accordingly, a principle object of the present invention is to simplify overall construction of single-, two- and three-axis encoders.

It is another object of the invention that the disassembly, cleaning and re-assembly of a single-axis optical encoder disc scale, a phototransmitter and an opto-electronic receiver unit are uncomplicated.

It is a further object of the invention to detect cracks in the body of the rotatory disc scale, irrespective of the positioning of the actual optical scale on the disc.

Another object of the invention is to devise a two- or three-axis encoder or coordinate input device with minimum frictional members and maximum user accessibility to all the primary optical elements.

An additional object of the invention is to propose a completely free-to-roll error-inputting device used to control a toy robot to stand, to move upright and to mimic human action.

It is a further object of the invention to integrate a three-axis encoder with a robotic or prosthetic ball-and-socket joint.

It is again an object of the invention to generate an extra electrical signal in response to vertical bi-directional impact or force on the free-rolling element.

BRIEF DESCRIPTION OF THE SEVERAL VIEWS OF THE DRAWINGS

The drawings on five sheets are seventeen in number. FIG. 6 through FIG. 16 are drawn to landscape orientation, in order to bring out the cross-sectional details properly by using a larger scale. Numerals are employed to identify features and components of the drawings. Identical numerals denote functional and positional similarity throughout the several views.

FIG. 1 is a schematic representation, in perspective, of an arrangement for a phototransmitter (LED in this case), an encoder disc and an opto-electronic sensor to function as a single-axis encoder of the present invention.

FIG. 2 is a side view of the arrangement of FIG. 1 with some of the graduations on the encoder disc omitted from the drawing in order to prevent the complete obscuring of the LED.

FIG. 3 is a plan view of the arrangement of FIG. 1 also showing the possible directions of rotation.

FIG. 4 is a plan view of an arrangement for two phototransmitters (LEDs in this case), three opto-electronic sensors and a spherical optical scale to function as a triple-axis encoder of the present invention.

FIG. 5 is a side view of the arrangement of FIG. 4 to function as a triple-axis encoder.

FIG. 6 is an enlarged cross-sectional view taken along line 6—6 in FIG. 4 to show details of employing an internal transparent, hollow spherical float to generate an extra electrical signal.

FIG. 7 is an enlarged diagrammatic representation of a solid angle of approximately 8 degrees cut out of an undifferentiated spherical shape, employed to construct various encoder scales for two- or three-axis encoders of the present invention. This figure is a precursor to FIG. 9 through FIG. 16.

FIG. 8 is an enlarged diagrammatic representation of a solid sector of approximately 8 degrees cut out of an undifferentiated cylindrical disc, employed to construct various encoder scales for single-axis encoders of the single-axis encoder of the present invention. This figure is a precursor to FIG. 9 through FIG. 11.

FIG. 9 is a cross-sectional view taken along lines 9—9 in FIG. 7 and FIG. 8 to show details of a solid, transparent homogenous encoder-scale body.

FIG. 10 is a cross-sectional view taken along lines 10—10 in FIG. 7 and FIG. 8 to show details of a solid, partially transparent encoder-scale body with various dispersed elements.

FIG. 11 is a cross-sectional view taken along lines 11—11 in FIG. 7 and FIG. 8 to show details of a solid, transparent encoder-scale body with optical-scale elements positioned near the inside of the outer periphery of said body.

FIG. 12 is a partial cross-sectional view along line 12—12 of FIG. 7 to show relevant details from a hollow encoder-scale body with actual optical-scale elements fully, constituting said body.

FIG. 13 is a partial cross-sectional view along line 13—13 of FIG. 7 to show relevant details from a sealed, hollow encoder scale body made of transparent thermoplastic with optical-scale elements placed flush with the outer boundary of said body.

FIG. 14 is a partial cross-sectional view along line 14—14 of FIG. 7 to show relevant details from a sealed, hollow encoder-scale body made of transparent thermoplastic with optical-scale elements placed inside the outer boundary of said body.

FIG. 15 is a partial cross-sectional view along line 15—15 of FIG. 7 to show relevant details from a sealed hollow, spherical encoder-scale body made of transparent thermoplastic with fine optical-scale elements placed all around the outer boundary of said body.

FIG. 16 is a partial cross-sectional view along line 16—16 of FIG. 8 to show relevant details from a sealed hollow, spherical encoder-scale body made of transparent thermoplastic with fine optical-scale elements placed inside the outer boundary of said body.

DETAILED DESCRIPTION OF THE INVENTION

Figure 17:
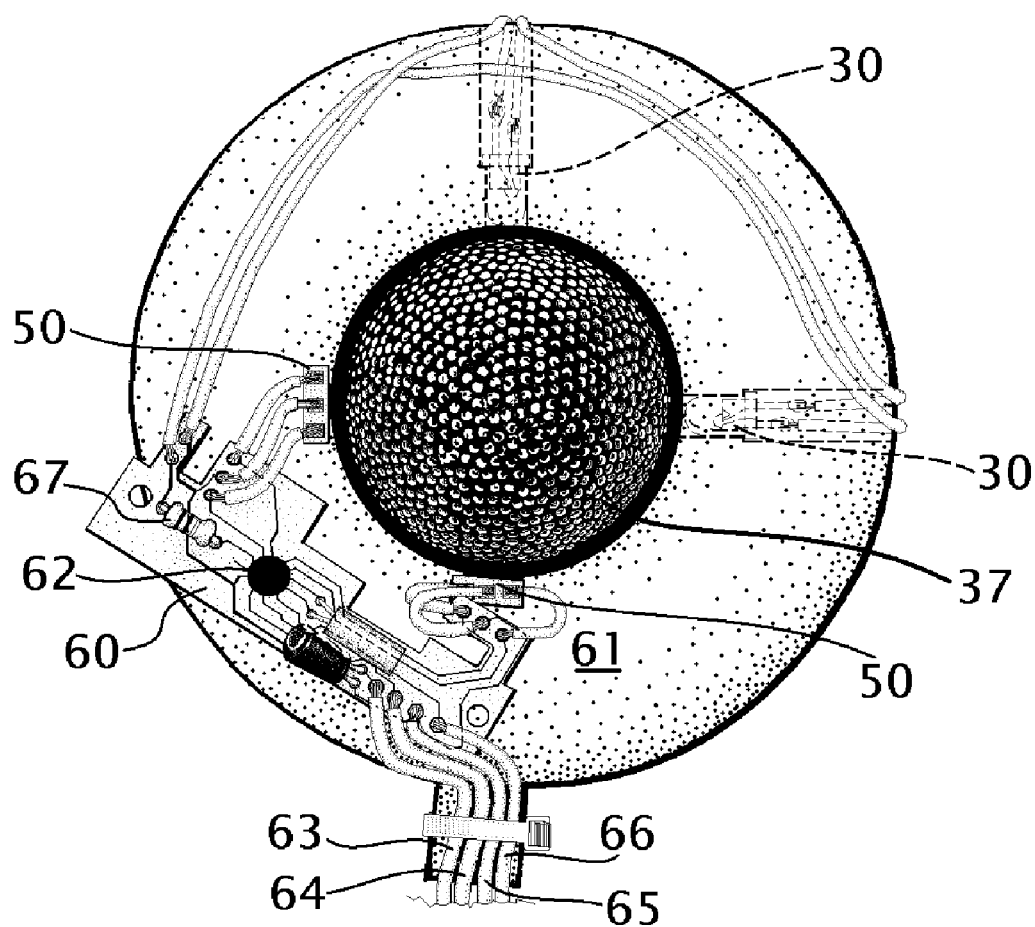
FIG. 17 is a schematic representation, in perspective, of a wired up arrangement for two phototransmitters (LEDs in this case), two dual-diode or dual-phototransistor opto-electronic sensors and a spherical optical scale with polygonal openings to function as a double-axis encoder of the present invention.

Referring to FIG. 1, an approximately parallel beam of light of certain wavelengths or bandwidth is emitted by a phototransmitter, non-diffused LED 30, towards the cylindrical surface 28 of encoder disc 29 made of a transparent material—a thermoplastic or glass. Said parallel beam of light would have crossed encoder disc 29 as secant lines. However, due to refraction in the medium which constitutes encoder disc 29, said beam angles towards central axis 32, comes out roughly from near opto-electronic sensor 31 and falls on the photosensitive part of it. Opto-electronic sensor 31 consists of twin photodiode, phototransistor or light-dependent resistor units with one pin from each unit connected together; the physical positioning of said units is one on the other with electrical connections pointing downwards, like opto-electronic sensor units 54 and 55 inside dual opto-electronic sensor 50 of FIG. 6. The travel of said beam of light through all circular and elliptical sectional planes of the cylindrical optical medium of encoder disc 29 is governed by four factors: one, transmittance of encoder disc 29; two, total internal refraction through the same; three, internal reflection by surfaces 34 and 35 (FIG. 2); and, four, surface finish and texture of cylindrical surface 28 (FIG. 1). If graduation 33, consisting of various lines of varying or uniform width, opaque to the light emitted by LED 30, is placed evenly or unevenly on cylindrical surface 28, it produces a pattern of variation in the intensity of light falling on said sensitive area of opto-electronic sensor 31, which induces proportional electrical changes in the electrical circuit to which opto-electronic sensor 31 is connected. In one way, graduation 33 is placed outside on the cylindrical surface of encoder disc 29 in said distribution. In other ways, it is either non-existent (FIG. 9), embedded to a certain volumetric scheme or pattern (elements of varied opacity 41 in FIG. 10), or embedded in a cylindrical fashion near the outer periphery of said disc (optical encoder elements 46 in FIG. 11). Basic material for construction in FIG. 9, FIG. 10 and FIG. 11 is any kind of transparent glass, but, alternatively, it can be a transparent and tough thermoplastic.

As mentioned hereinabove, the finish of surfaces 34 and 35 is of importance because greater reflection from surfaces 34 and 35 increases the intensity of light reaching said surface of opto-electronic sensor 31. The present invention can easily be used to know the condition of the circular optical scale used with conventional opto-electronic encoders with axially placed opto-electronics. Without disturbing the existing placement of said opto-electronics, LED 30 and opto-electronic sensor 31 have to be positioned as shown in FIG. 1, while the existing opto-electronics remain facing surfaces 34 and 35. The internal medium of encoder disc 29 is homogenous as shown in FIG. 9, and graduations 33 in any form are absent from cylindrical surface 28. As encoder disc 29 accumulates dirt on its cylindrical surface 28 and flat surfaces 34 and/or 35, starts chipping near the edges of cylindrical surface 28, or develops internal cracks inside encoder disc 29, the original optical homogeneity of disc 29 is lost and the pattern of intensity of light falling on said surface of opto-electronic sensor 31 alters. An analogue or digital processor circuit identifies said alteration translated into electrical variations in opto-electronic sensor 31. This outputs an alarm to a desired electronic address or human monitoring position.

The construction of a single-axis encoder with the present invention consists of a printed circuit board annular in profile, or a plurality of printed circuit boards assembled on annular-profile base 59 forming orbicular confines to encoder disc 29, containing LED 30 and opto-electronic sensor 31 in approximately the same orientation as shown in FIG. 1, FIG. 2 and FIG. 3, together with electronic components necessary for driving LED 30, processing the output of opto-electronic sensor 31 and an electrical arrangement to connect to similar or other equipment. The arrangement and scheme of means or elements that allow the entry and exit of said light could be optimally selected by somebody familiar with related art. The resolution of the optical scale (means that allow the entry and exit of said light), graduations 33 in FIG. 1, is maximum when put on cylindrical surface 28. Other variants of the optical scale, discussed hereinbefore, do not offer as high a resolution as do graduations 33 on cylindrical surface 28. However, they too have distinct functional advantages—ranging from higher reliability to greater secrecy. The construction of said encoder is complete with the linkage of central axis 32 (FIG. 1) to the prime rotational unit via a shaft or a screw passing through hole 36 (FIG. 3), allowing bi-directional rotations in circular directions 27 (FIG. 1 and FIG. 3).

FIG. 4 and FIG. 5 show the basic construction of a three-axis encoder or error-inputting device for a toy robot. Spherical body 37 is of spherical construction with distribution of means for entry into, exit from and travel along circular sectional planes of spherical body 37, of said light from LED 30 arranged in any one of the manners shown in FIG. 10 through FIG. 16. The manner shown in FIG. 10 cannot easily produce a linear scale. The rest of the arrangements can be selected according to suitability for an application. The arrangement in FIG. 11, with optical encoder elements 46 embedded cylindrically or spherically near to the outer periphery, is suitable for making rugged and heavy two- or three-axis encoders or error-inputting devices, which function under the influence of gravity or in linkage or contact with a prime moving part or surface. Still, while functioning, if spherical body 37, made according to FIG. 11, comes in frequent contact with abrasive particles, the external polish required for optimum optical performance of spherical body 37 would deteriorate, affecting the proper functioning of said encoders or devices. The arrangement shown in FIG. 12 is most appropriate for functioning in extremely harsh environments. Spherical body 37 is built entirely from the elements of optical scale, encoder perforation 44 (FIG. 12), which could be any material opaque to the light from LED 30 and able to withstand externally applied forces. The arrangements shown in FIG. 13 through FIG. 16 depict spherical body 37 constructed of any transparent thermoplastic, with elements of optical scale incorporated. This choice of material makes spherical body 37 susceptible to frictional and environmental degradation. In FIG. 13, the exterior of encoder perforation 44 is flush with the exterior of the transparent thermoplastic used to build spherical body 37. In another variation, encoder perforation 44 in FIG. 14 is laid spherically, roughly in the middle of the thickness of the transparent, thermoplastic, hollow embodiment of spherical body 37. In its embodiments in FIG. 13 and FIG. 14, encoder perforation 44 remains of the same thickness as depicted in FIG. 12, but could be made with a material, opaque to said light, but weaker in comparison to the one used to make encoder perforation 44 of FIG. 12. FIG. 16 is identical in all other respects to FIG. 14, except for optical encoder elements 46 (FIG. 16) being appreciably thinner than encoder perforation 44 (FIG. 13 and FIG. 14). The scheme for arranging optical encoder elements in FIG. 13 has the danger of the chipping away of the transparent thermoplastic from the exterior of optical openings in encoder perforation 44. That is avoided by utilizing the schemes in FIG. 14 and FIG. 16. The scheme for arranging optical encoder elements in FIG. 15 offers the highest resolution, but suffers from dirt accumulation in the cavities formed by optical openings 45 in optical encoder elements 46.

In FIG. 4, dual opto-electronic sensor 50 senses encoded rotation of spherical body 37 in circular directions 51. Likewise, two of dual opto-electronic sensors 50 are placed perpendicular to each other (locations 48 and 49, FIG. 5) with their photosensitive openings facing spherical body 37 (FIG. 5). Dual opto-electronic sensor 50 at location 48 (FIG. 5) senses encoded rotation of spherical body 37 in circular directions 52 (FIG. 5). Dual opto-electronic sensor 50 at location 49 (FIG. 5) similarly functions during the rotation of spherical body 37 in circular directions 53 (FIG. 4). The components comprising two numbers of LED 30, three numbers of dual opto-electronic sensors 50 (one location unmarked, the other two marked 48 and 49 in FIG. 5) as shown in FIG. 4 and FIG. 5 are assembled either on an annular-profile printed circuit board (PCB) or on a plurality of PCBs fixed on an annular-profile base, which encircles spherical body 37 roughly around the median plane—near about level 39 in FIG. 6. To make a two- or three-axis encoder or an error-inputting device, said components with said annular-profile PCB or base are assembled with appropriate elements to form orbicular confines 61 (FIG. 17) within which spherical body 37 is able to rotate freely, or to roll on a supporting surface with orbicular confines 61 traversing along. Orbicular confines 61 to spherical body 37 are such as not to allow its release from the orbicular confines during normal functioning of the whole apparatus. Orbicular confines 61 appear overall from outside as a toroidal profiled object encircling spherical body 37, containing said functional opto-electronic and electronic components. A ball-and-socket joint with integrated three-axis encoder is made by mechanically connecting the toroidal-profile orbicular confines 61 in a modified form to one end of a limb and connecting spherical body 37 to the logical end of another limb. This ball-and-socket joint with the integrated three-axis encoder of the present invention is easily adapted to prosthetic, as well as robotic, use. The replacement of standard, panel-mounting package of LED 30 with a miniature side-looker package or a subminiature flat surface mount reduces space taken up by the opto-electronics, facilitating implementation of the present invention in said joint. Discussed hereinbefore, various details of optical encoder elements determining the entry, travel and exit of light emitted by two numbers of LED 30 positioned as depicted in FIG. 4 and FIG. 5 are not shown on spherical body 37 in FIG. 4 and FIG. 5, as said details are shown separately in FIG. 9 through FIG. 16.

Also possible with this invention, as shown in FIG. 6 is another extra function of generating an impact- or pressure-sensitive output. The light emitted by LED 30 travels above level 39 to reach dual opto-electronic sensor 50, the relative positions of each opto-electronic sensor unit inside dual opto-electronic sensor 50 shown as 54 and 55. There are two large and small, hollow spherical bodies 40 and 57. The latter has a measured volume of liquid 38, which has properties of being opaque to the wavelength or bandwidth of light emitted by LED 30. Liquid 38 can be a solution and/or mixture of various chemicals, in which many gases may be/are dissolved. It could also be partially or fully a suspension of various solids in a liquid medium. The selection of liquid 38 is governed mainly by its ability to block the light emitted by LED 30, its density and liquid 38 being non-toxic to humans in the volume present inside large, hollow spherical body 40. Large and small, hollow spherical bodies, respectively 40 and 57, have high transmittance for the light emitted from LED 30. However, they can have properties to block the rest of the wavelengths. Small, hollow spherical body 57 remains afloat in liquid 38; and at the same time, the top outer crest of small, hollow spherical body 57 touches the top, inner surface of large, hollow spherical body 40, amply shown in FIG. 6. In order to prevent the loss of liquid 38 or deterioration of physical properties of small, hollow spherical body 57, large and small, hollow spherical bodies 40 and 57 are impervious to outside gases and liquids over a wide temperature range. With certain pressure applied on top of large, hollow spherical body 40 top, consequent distortion takes place in its shape, pushing down small, hollow spherical body 57 which in turn raises level 39 of liquid 38. After a certain extent, this process completely blocks the path of light from LED 30 to dual opto-electronic sensor 50. The same happens to the other one or two opto-electronic set or sets of transmitters and receivers, which are essentially two numbers of LED 30 and dual opto-electronic sensor 50 in arrangements discussed hereinabove and shown in FIG. 4 and FIG. 5. This simultaneous absence of incidence of light emitted by two numbers of LED 30 from a plurality of dual opto-electronic sensors 50 produces a unique condition. This is easily translated either into an electrical signal, or into a data bit to an electronic address. Said signal or data bit is also generated due to an impacting force on, or physical disturbance of, said apparatus of the present invention, which acts on said spherical bodies 40, 57 and level 39 of liquid 38 in a manner similar to the one described just hereinbefore.

Hence, one well versed in similar art can easily construct from the preceding description of the present invention an error-inputting balancing device, which would additionally do inputting of rotational movements by a toy robot and would also facilitate its mimicry of human loss of consciousness following a blow. In order to be able to shift the center of gravity of spherical body 37 away from its geometric center, said body is made of two halves. One half is similar to the one in FIG. 16, while the other is similar to the one in FIG. 14. Optical encoder elements 46 and encoder perforation 44 are made of a strong, high-density metal, like brass, for obtaining a greater said shift in the center of gravity of spherical body 37. Joining said two halves produces spherical body 37 with a shifted center of gravity. Another way is to first join the two semi-spherical halves of the outer construction as depicted in FIG. 12, but to use a comparatively much thinner, but stronger, metal sheet to produce encoder perforation 44 for one half, and then to join the two halves whose exteriors look identical; this also produces a porous form of spherical body 37 with said shifted center of gravity. Yet another way of achieving a marked shift in the center of gravity of spherical body 37 is to peripherally connect a cylindrical rod of much less diameter to spherical body 37 from position 56 in FIG. 5. Allowable space and functionality determine the length of the rod. This method makes use of a totally symmetrical form of spherical body 37, hence easing its manufacture, but has the disadvantage of severely restricting its rotational mobility.

Similarly, a reference again to FIG. 4 and FIG. 5 is made to explain the construction of a two-axis encoder or inputting apparatus. The removal of dual opto-electronic sensor 50 with its companion LED 30 (one of the two numbers of LED 30 in FIG. 4) converts the apparatus of FIG. 4 into a polar coordinate-inputting device. Whereas, with reference to FIG. 5, the removal of dual opto-electronic sensor 50 from location 49 makes the apparatus of FIG. 5 a Cartesian coordinate-inputting device.

The electronic processing and storage of various signals from the opto-electronic sensors is varied, widely known and used by those of skill in the related art. Likewise, electrical driving techniques for LEDs are also widely known. Organic light sources are electrically driven in manners peculiar to their design. An organic light-emitting device (OLED), not yet standardized, is electrically similar to an LED, and has a knee voltage of approximately 3 Volts. An OLED's current intake is very little compared to a normal industry-standard LED, as well as its luminous output. Rays from the Sun are parallel, and therefore are a perfect source of light to replace LED 30 in FIG. 1 through FIG. 6. In FIG. 5, by placing two more of dual opto-electronic sensor 50 so that they are oriented to each other as between locations 48 and 49, at position 56, with photosensitive regions of said sensors facing spherical body 37, a feature of solar tracking or avoidance is built into said error-inputting balancing device for a toy robot. Rays from the Sun enter the optical encoder elements of spherical body 37 from its top side (FIG. 5) and travel through spherical body 37 to come out from said elements and strike said regions of two more numbers of dual opto-electronic sensor 50 placed in said orientation at position 56. A toy robot fitted with said device with said addition at position 56 in FIG. 5 would be able to distinguish between sunlight, diffused light and light from an incandescent source, with the addition of appropriate data processing circuits to the present invention.

A choice has to be made between an integrated dual photodiode sensor device schematically detailed in FIG. 6 with the two opto-electronic sensor units 54 and 55 within the dual opto-electronic sensor 50 and other available opto-electronic devices functioning as opto-electronic sensor 31 (FIG. 1 through FIG. 6). An integrated common-anode double photodiode is widely available with good resolution to sense infrared light coming out of encoder element apertures as narrow as half a millimeter. The response time of a photodiode is also the shortest in comparison to the same of other opto-electronic sensors. The use can be made of phototransistors or photodarlington transistors even when the intensity of incident light is little or very little. Light-dependant resistors can also be used in slow-speed encoder applications. For critical applications, two photodiodes together with other signal shaping and detecting circuits fabricated on an integrated circuit (IC) can be used as dual opto-electronic sensor 50. This is shown in FIG. 17, where IC 62 is connected to two dual opto-electronic sensors 50 via tracks on PCB 60. Two LEDs 30 are connected in series via current limiting resistor 67 together with other electronic components necessary for driving LEDs 30 in IC 62. The processing of the output of dual opto-electronic sensors 50 takes place in IC 62 and an electrical arrangement to connect to similar or other equipment is shown with connecting wires 63, 64, 65 and 66.

The use of infrared LEDs and matching dual-photodiode sensors has tested the present invention. However, use can be made of other wavelengths and bandwidths according to the requirements of the application. Appropriate filters can be added to spherical body 37 or encoder disc 29 to only allow passage of relevant wavelengths or bandwidth to which the opto-electronic sensors used are most sensitive. These filter elements impart a definite tint to spherical body 37 or encoder disc 29, making the details of an optical scale visually hard to locate, and in some cases, protecting the secrecy of a code on the optical scale.

Certain workings have shown that to make use of readily available electronic circuitry, like a standard computer inputting device (mouse) circuitry shown in FIG. 17 with PCB 60 and IC 62 and associated components, which would function with dual opto-electronic sensor 50, the area of the largest optical closing on chosen optical scale should be around one tenth of the effective area of illumination by the approximately parallel beam of light coming out of the chosen optical transmitter of the present invention.

What is claimed is:

1. An apparatus for directly producing encoded analogue and/or digital signals from a motion under the influence of a force or torque exerted varyingly by linked and/or external elements, for data processing and/or data logging, comprising:

orbicular confines to a spherical body and said spherical body rotatable relative to said orbicular confines under the influence of said force or torque;

said orbicular confines and said spherical body separately attachable to said linked and/or external elements, or separately integrable with said linked elements;

means arranged externally to said spherical body, connected to said orbicular confines, for emission of light directed to said spherical body along the circular sectional planes of said spherical body;

said spherical body having selective means for entry into, travel along and exit from said circular sectional planes of said spherical body of said light directed to said spherical body along said circular sectional planes;

means connected to said orbicular confines and positioned externally to said spherical body for opto-electronic detection of variations in said light after full crossing by said light of said selective means for entry into, travel along and exit from said circular sectional planes of said spherical body.

2. An encoding apparatus in accordance with claim 1, wherein said spherical body is outwardly a spherical body and inwardly a spherical cavity, with proximate geometrical centers, and is impervious to non-corrosive liquids and gases present outside said spherical body within temperatures of 0 degree to 70 degrees centigrade.

3. A spherical body in accordance with claim 2, wherein said spherical cavity is filled in volume with a gas or gases and a liquid solution and/or suspension non-toxic to life.

4. A spherical body in accordance with claim 3, wherein said spherical cavity in containment of, exclusive of said liquid, a small, spherical body of density less than that of said liquid in which is dissolved and/or suspended elements to render said liquid opaque to the wavelengths or bandwidth of said light effective for said opto-electronic detection of variations in said light, whereas said small, spherical body has high transmittance for said wavelengths or bandwidth of said light.

5. A spherical body in accordance with claim 4, wherein the absence of a vertically directed force on said spherical body has the upper horizontal level of said liquid filled in said volume of said spherical cavity to remain horizontally below said means for opto-electronic detection of variations in said light.

6. A spherical body in accordance with claim 4, wherein, due to the presence of said force, said small, spherical body in said containment of said spherical cavity displaces said liquid upwards to stop said light from said travel along said circular sectional planes of said spherical body and to reach said means for opto-electronic detection of variations in said light.

7. An encoding apparatus in accordance with claim 1, wherein said spherical body is a hollow, spherical ball with regular polygonal physical openings in the spherical surface of said spherical body distributed superficially in a uniform or coded pattern to act as said selective means for entry and exit of said light into and from said circular sectional planes of said hollow, spherical ball.

8. A spherical body in accordance with claim 1, wherein the center of gravity of said spherical body is markedly away from the geometrical center of said spherical body.

9. An encoding apparatus in accordance with claim 1, wherein said spherical body is wholly or selectively made of material having a high transmittance for wavelengths or bandwidth of said light to which the sensitivity of said means for opto-electronic detection of variations in said light is maximum.

10. An encoding apparatus in accordance with claim 1, wherein said means for emission of light include a light-emitting diode (LED) or an organic light-emitting device (OLED).

11. An encoding apparatus in accordance with claim 1, wherein said means for opto-electronic detection of variations in said light include a photodiode.

12. An encoding apparatus in accordance with claim 1, wherein said means for opto-electronic detection of variations in said light include a common-anode double photodiode.

13. An encoding apparatus in accordance with claim 1, wherein said means for opto-electronic detection of variations in said light include a phototransistor.

14. An encoding apparatus in accordance with claim 1, wherein said means for opto-electronic detection of variations in said light include two photodiodes connected to an integrated circuit (IC) containing other electronic components besides said photodiodes.

15. An encoding apparatus in accordance with claim 1, wherein said means for opto-electronic detection of variations in said light include a light-dependant resistor (LDR).

16. An encoding apparatus in accordance with claim 1, wherein said means for detection of variations in said light include a charge-coupled device (CCD).

17. An encoding apparatus in accordance with claim 1, wherein said selective means for entry and exit of said light into and from said circular sectional planes of said spherical body are internally proximate to the outer periphery of said spherical body.

18. An encoding apparatus in accordance with claim 1, wherein said selective means for entry and exit of said light into and from said circular sectional planes of said spherical body form the outer boundary to said spherical body.

19. An encoding apparatus in accordance with claim 1, wherein said selective means for travel along said circular sectional planes of said spherical body of said light are distributed homogeneously on said circular sectional planes of said spherical body.

20. An encoding apparatus in accordance with claim 1, wherein said selective means for travel along said circular sectional planes of said spherical body of said light are distributed in a regular or coded pattern on some or all of said circular sectional planes of said spherical body.

* * * * *